H. M. PLATT.
Rotary Cultivator.
No. 20,659.
Patented June 22, 1858.
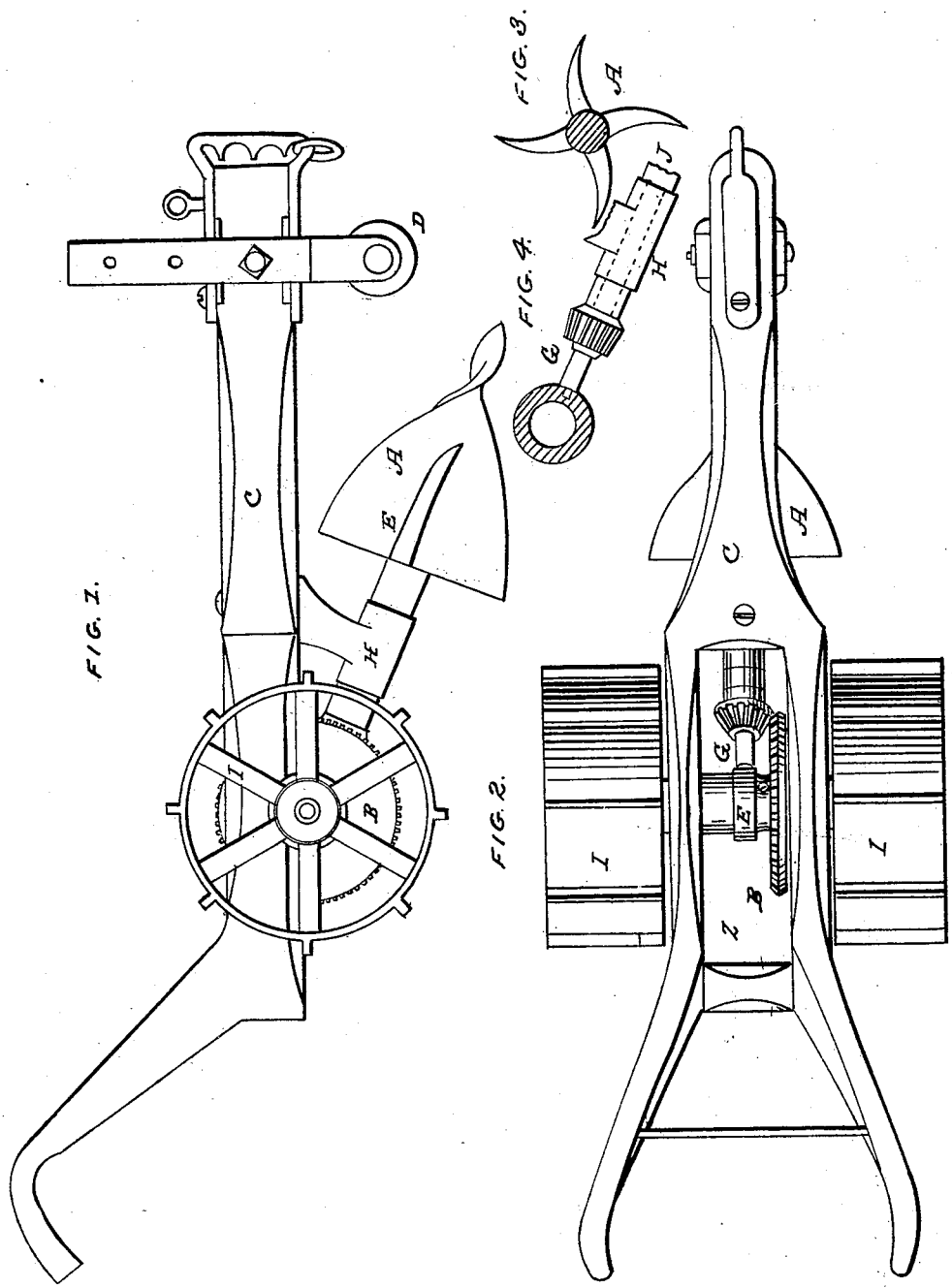

UNITED STATES PATENT OFFICE.

HENRY M. PLATT, OF DARIEN, CONNECTICUT.

IMPROVEMENT IN PLOWS.

Specification forming part of Letters Patent No. 20,659, dated June 22, 1858.

*To all whom it may concern:*

Be it known that I, HENRY M. PLATT, of Darien, in the county of Fairfield and State of Connecticut, have invented certain Improvements in Plows; and I hereby declare that the following is a full and exact description thereof.

The nature of my invention consists in causing a four-winged and screw-formed share to revolve as it passes through the soil, and thus pulverize it for the purposes of agriculture.

To enable others to make and use my invention, I proceed to describe its construction and operation, reference being had to the drawings hereunto annexed, and making part of this specification.

Figure 1, is a side elevation of the plow; Fig. 2, bird's-eye view; Fig. 3, diagram showing the form of the wings of the plowshare when seen in transverse section; Fig. 4, the plow-shaft and the collar.

The same letters refer to the same things in all the drawings.

A is the winged and screw-shaped plow-share; B, bevel spur-wheel for driving the plow in its rotary motion; C, the beam; D, the roller; E, the middle wing of the plowshare; F, the center box, made firm, into which the shaft of the plow is pivoted at G; H, the main box for holding the shaft of the plow; I, the wheels which support the plow; J, the plow-shaft.

The plow-beam is peculiar in shape, having a slot, Z, to hold the works. (See Fig. 2.) It is supported upon the shaft of two wheels, I, which shaft is set in the collar F. These wheels have broad tires to prevent sinking into the ground. Spurs or ridges are cast or set on the periphery to prevent the slipping of the wheels.

Upon the shaft of the wheels is set a bevel spur-wheel, B, meshing into the pinion which is upon the plow-shaft at G. This multiplies the rotary motion of the plow, so as to pulverize the soil through which it passes.

There is a roller set at the forward end of the beam, behind the clevis, to regulate the depth at which the plow shall go into the ground.

The collar F forms part of one of the boxes under the beam, in which runs the shaft of the supporting-wheels.

The form of the plowshare is seen in Fig. 1 and a section of it at Fig. 3. There is a curve given to each wing, by which the share has a tendency to cut any turf it may come in contact with, and thus aid in pulverizing the soil.

The screw share may be described as a plate twisted half round, in the manner of an auger, with an additional wing, E, upon each side, reaching about two-thirds of the way toward the point, the additional wings also turned in the screw form.

What I claim as my invention, and desire to secure by Letters Patent, is—

The arrangement of the screw-shaped plow-share A, having wings E, with boxes H and F, wheels I, and roller D, the whole being constructed and operating conjointly in the manner and for the purpose herein set forth.

HENRY M. PLATT.

Witnesses:
OWEN G. WARREN,
JACOB HORN.